(12) United States Patent
Sasaki et al.

(10) Patent No.: US 11,243,090 B2
(45) Date of Patent: Feb. 8, 2022

(54) DRIVING ASSISTANCE DEVICE, CONTROL METHOD, AND NON-TRANSITORY COMPUTER-READABLE MEDIUM STORING PROGRAM

(71) Applicant: TOYOTA JIDOSHA KABUSHIKI KAISHA, Toyota (JP)

(72) Inventors: Akira Sasaki, Miyoshi (JP); Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 16/292,538

(22) Filed: Mar. 5, 2019

(65) Prior Publication Data

US 2019/0285430 A1    Sep. 19, 2019

(30) Foreign Application Priority Data

Mar. 14, 2018    (JP) .............................. JP2018-046770

(51) Int. Cl.
  *G01C 21/36* (2006.01)
  *H04W 4/48* (2018.01)

(52) U.S. Cl.
  CPC ..... *G01C 21/3626* (2013.01); *G01C 21/3605* (2013.01); *G01C 21/3664* (2013.01); *H04W 4/48* (2018.02)

(58) Field of Classification Search
  CPC ............ G01C 21/3626; G01C 21/3664; G01C 21/3605; H04W 4/48
  See application file for complete search history.

(56) References Cited

U.S. PATENT DOCUMENTS

| | | | |
|---|---|---|---|
| 9,792,736 B1* | 10/2017 | Koebler | ................ B60L 7/12 |
| 2009/0247151 A1 | 10/2009 | Kameyama | |
| 2010/0138149 A1 | 6/2010 | Ohta et al. | |
| 2015/0105100 A1 | 4/2015 | Magarida et al. | |
| 2015/0148989 A1* | 5/2015 | Cooper | ................ H04L 67/306 701/2 |
| 2015/0177362 A1* | 6/2015 | Gutierrez | ............... G08B 21/24 701/519 |

(Continued)

FOREIGN PATENT DOCUMENTS

| | | |
|---|---|---|
| JP | 2002-098543 A | 4/2002 |
| JP | 2009-232415 A | 10/2009 |

(Continued)

*Primary Examiner* — Mathew Franklin Gordon
(74) *Attorney, Agent, or Firm* — Oliff PLC

(57) ABSTRACT

A driver assistance device mounted on a vehicle includes a communication unit; an output unit; an input unit configured to detect user input; and a control unit configured to perform driver assistance with use of a point on a map as a destination. The control unit is configured to i) execute a connection process to connect the driver assistance device to a terminal device wirelessly via the communication unit, ii) output identification information on the terminal device as an image or a voice via the output unit after the driver assistance device is wirelessly connected to the terminal device, and iii) execute a setting process to set the point determined by the terminal device as the destination for the driver assistance in a case where the control unit detects specified user input via the input unit after outputting the identification information on the terminal device.

6 Claims, 5 Drawing Sheets

(56) References Cited

U.S. PATENT DOCUMENTS

2017/0316254 A1* 11/2017 Hariri ................ G06K 9/00255

FOREIGN PATENT DOCUMENTS

| JP | 2010-130669 A | 6/2010 |
| JP | 2012-191349 A | 10/2012 |
| JP | 2013-108915 A | 6/2013 |
| JP | 2014-127852 A | 7/2014 |
| JP | 2017-505253 A | 2/2017 |
| WO | 2013/157136 A1 | 10/2013 |
| WO | 2014/118912 A1 | 8/2014 |

* cited by examiner

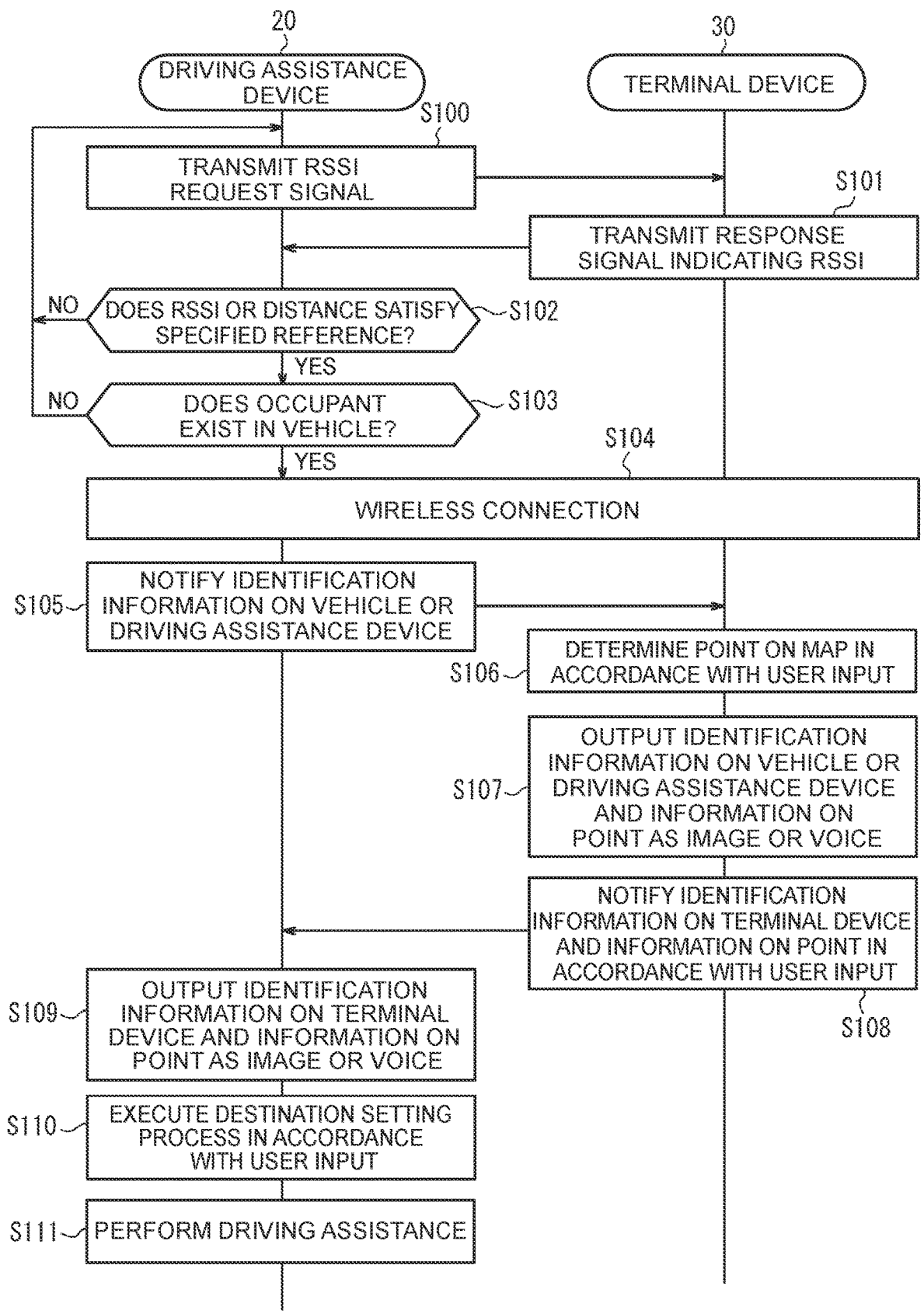

DRIVING ASSISTANCE DEVICE, CONTROL METHOD, AND NON-TRANSITORY COMPUTER-READABLE MEDIUM STORING PROGRAM

INCORPORATION BY REFERENCE

The disclosure of Japanese Patent Application No. 2018-046770 filed on Mar. 14, 2018 including the specification, drawings and abstract is incorporated herein by reference in its entirety.

BACKGROUND

1. Technical Field

The disclosure relates to a driving assistance device, control method, and a non-transitory computer-readable medium storing a program.

2. Description of Related Art

A technique of performing driving assistance for a vehicle with the use of a plurality of devices mutually connected wirelessly has been known. For example, Japanese Patent Application Publication No. 2002-098543 (JP 2002-098543 A) discloses a navigation system including near-field wireless communication means for exchanging information with a mobile communication terminal; and information storage means for exchanging the information with the mobile communication terminal to acquire and store the information when the mobile communication terminal enters a communicable area of the near-field wireless communication means. Japanese Patent Application Publication No. 2010-130669 (JP 2010-130669 A) discloses that, in the case where a mobile terminal enters an area where near-field wireless communication with an in-vehicle device is possible, the in-vehicle device and the mobile terminal perform a pairing process to establish the wireless communication.

SUMMARY

The above-described navigation system in the related art can exchange the information with an unspecified mobile communication terminal that enters the communicable area. Thus, the navigation system in the related art may not be preferred in view of security. The security is improved by the above-described configuration in the related art in which the in-vehicle device and the mobile terminal perform the pairing process. However, the pairing process needs to be performed every time the establishment of the wireless connection is required. This may complicate the process. Thus, there is room for improvement in a driving assistance technique for a vehicle with the use of a plurality of devices mutually connected wirelessly, in view of security and a processing load.

The disclosure provides a driving assistance device, a control method, and a non-transitory computer-readable medium storing a program, which improve a driving assistance technique for a vehicle with the use of a plurality of devices mutually connected wirelessly, in view of security and a processing load.

A first aspect of the disclosure relates to a driving assistance device mounted on a vehicle. The driving assistance device includes a communication unit configured to perform communication; an output unit configured to output information as an image or a voice; an input unit configured to detect user input; and a control unit configured to perform driving assistance with use of a point on a map as a destination. The control unit is configured to i) execute a connection process to connect the driving assistance device to a terminal device wirelessly via the communication unit, ii) output identification information on the terminal device as the image or the voice via the output unit after the driving assistance device is wirelessly connected to the terminal device, and iii) execute a setting process to set the point determined by the terminal device as the destination for the driving assistance in a case where the control unit detects specified user input via the input unit after outputting the identification information on the terminal device.

A second aspect of the disclosure relates to a control method of a terminal device configured to communicate with a driving assistance device mounted on a vehicle. The control method includes determining a point on a map in accordance with user input; outputting identification information on the vehicle or the driving assistance device as an image or a voice when the terminal device is wirelessly connected to the driving assistance device; and notifying the driving assistance device of identification information on the terminal device and information on the point in a case where specified user input is detected after outputting the identification information on the vehicle or the driving assistance device.

A third aspect of the disclosure relates to a non-transitory computer-readable medium storing a program that causes a terminal device to perform operations. The terminal device is configured to communicate with a driving assistance device mounted on a vehicle. The operations include determining a point on a map in accordance with user input; outputting identification information on the vehicle or the driving assistance device as an image or a voice when the terminal device is wirelessly connected to the driving assistance device; and notifying the driving assistance device of identification information on the terminal device and information on the point in a case where specified user input is detected after outputting the identification information on the vehicle or the driving assistance device.

The driving assistance device, the control method, and the non-transitory computer-readable medium storing the program according to the above aspects of the disclosure improve a driving assistance technique for a vehicle with the use of a plurality of devices mutually connected wirelessly, in view of security and a processing load.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart showing operations of the driving assistance device and the terminal device.

DETAILED DESCRIPTION OF EMBODIMENTS

A description will hereinafter be provided on an embodiment of the disclosure.

Figure 1:
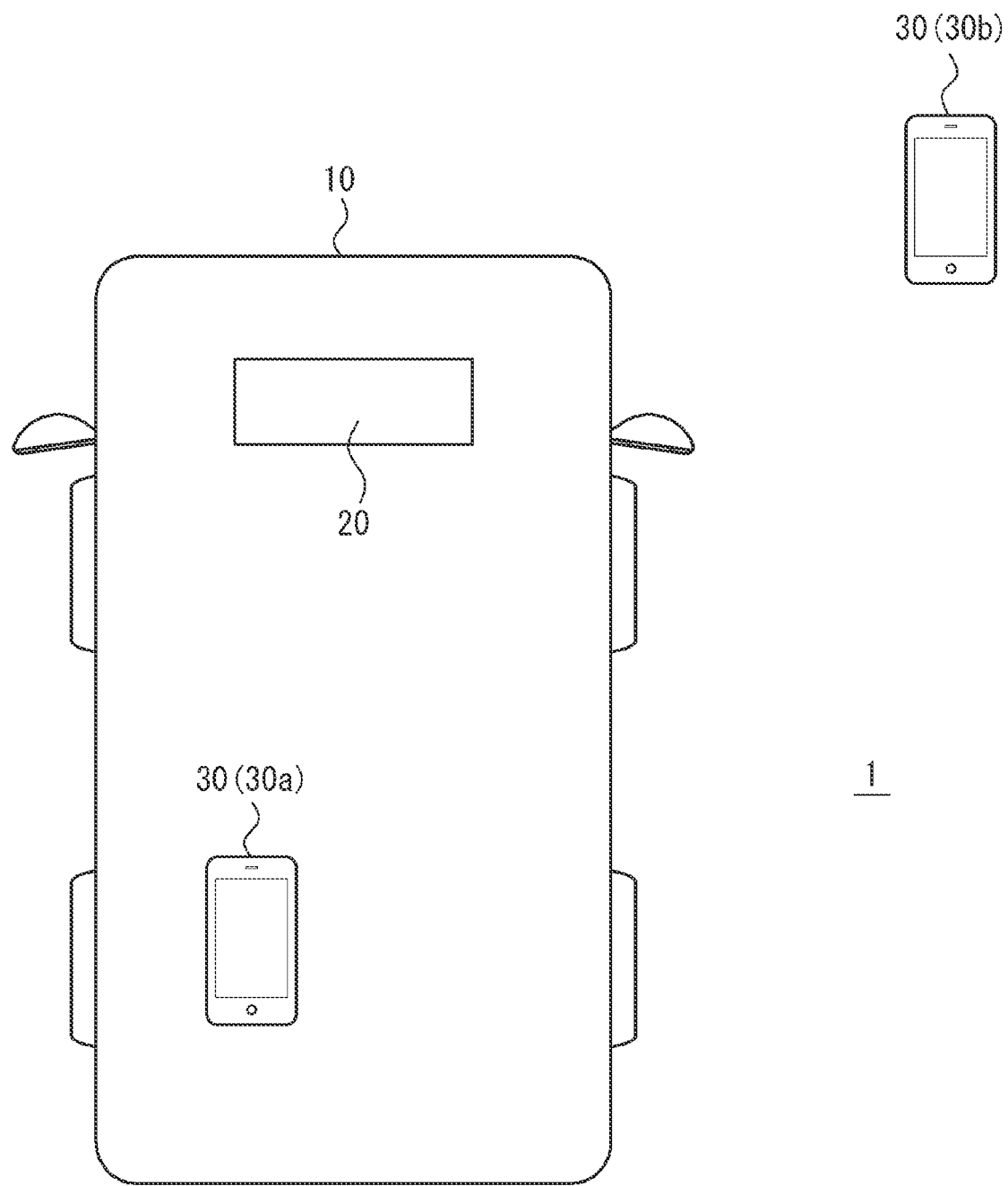
FIG. 1 is a schematic configuration diagram of a driving assistance system according to an embodiment of the disclosure.

Referring to FIG. 1, a description will be provided on an overview (of the configuration) of a driving assistance system 1 according to an embodiment of the disclosure. The driving assistance system 1 includes one or more vehicles 10; a driving assistance device 20 mounted on each of the vehicles 10; and one or more terminal devices 30. In FIG. 1, for convenience of the description, the vehicle 10, the driving assistance device 20, and two terminal devices 30a, 30b are shown. However, the number of the vehicles 10 provided in the driving assistance system 1 may be set to any number, the number of the driving assistance devices 20 provided in the driving assistance system 1 may be set to any number, and the number of the terminal devices 30 provided in the driving assistance system 1 may be set to any number. In an example of FIG. 1, the terminal device 30a is located in a vehicle cabin of the vehicle 10 and is possessed by a passenger who rides on the vehicle 10 together with a driver. Meanwhile, the terminal device 30b is located outside the vehicle cabin of the vehicle 10 and is possessed by an unspecified user who is not an occupant of the vehicle 10.

The vehicle 10 is an automobile, for example. However, the vehicle 10 is not limited thereto and may be any vehicle on which a person can ride. The driving assistance device 20 is disposed at a position where the occupant can operate the driving assistance device 20 in the vehicle cabin of the vehicle 10. For example, the driving assistance device 20 may be embedded in the vehicle 10, may be detachably attached to the vehicle 10, or may be mounted on the vehicle 10. The driving assistance device 20 is connected to the vehicle 10 via an in-vehicle network such as a Controller Area Network (CAN) or a dedicated line such that the driving assistance device 20 can communicate with the vehicle 10. The driving assistance device 20 performs driving assistance with the use of a point on a map as a destination. The driving assistance includes, for example, route guidance or automated driving to the destination, but the driving assistance is not limited thereto. The level of the automated driving is one of levels 3 to 5 defined by Society of Automotive Engineers (SAE), for example, but the level of the automated driving is not limited thereto and may be defined in any manner. The automated driving may be realized by cooperation between the driving assistance device 20 and an electronic control unit (ECU) or the like of the vehicle 10, for example. The terminal device 30 is a general-purpose mobile terminal such as a smartphone or a tablet terminal. However, the terminal device 30 is not limited thereto and may be any mobile terminal such as a dedicated device for the driving assistance system 1. In this embodiment, the driving assistance device 20 and the terminal device 30 are mutually connected wirelessly and thus can establish near-field wireless communication. A standard of the near-field wireless communication is Bluetooth Low Energy (a registered trademark), for example. However, the standard of the near-field wireless communication is not limited thereto and may be any standard such as near-field communication (NFC).

In an example, a user who rides on the vehicle 10 together with the driver uses a map displayed on the own terminal device 30 to specify a point that the user wants to set as the destination for the driving assistance. When the driving assistance device 20 and the terminal devices 30 are wirelessly connected, identification information on the vehicle 10, on which the driving assistance device 20 is mounted, (for example, a name, an ID, or the like of the vehicle 10) is displayed on the terminal device 30. The user of the terminal device 30 confirms that the identification information on the vehicle 10 on which the user rides matches the identification information on the vehicle 10 displayed on the terminal device 30. Then, the user performs a specified operation on the terminal device 30.

When the operation is performed, the driving assistance device 20 is notified of, and displays identification information on the terminal device 30 (for example, a name, an ID, or the like of the terminal device 30) and the above-described point specified by the terminal device 30. The occupant of the vehicle 10 (for example, the user of the terminal device 30) confirms that the identification information on the terminal device 30 possessed by the user matches the identification information on the terminal device 30 displayed on the driving assistance device 20. Then, the occupant performs a specified operation on the driving assistance device 20. When the operation is performed, the above-described point is set as the destination for the driving assistance in the driving assistance device 20. Thereafter, the driving assistance device 20 performs the driving assistance on the basis of the set destination. For example, the route guidance or the automated driving to the destination is performed.

Thus, according to the driving assistance system 1, the driving assistance device 20 is notified of the point that is specified by the terminal device 30, and the driving assistance device 20 sets the point as the destination for the driving assistance. After the identification information on the vehicle 10, on which the driving assistance device 20 is mounted, is displayed on the terminal device 30, a notification is provided in accordance with the user's operation on the terminal device 30. Thus, the user of the terminal device 30 can cause the terminal device 30 to provide a notification to the vehicle 10 after confirming that a notification destination is the vehicle 10. As a result, it is possible to reduce a security risk, that is, it is possible to reduce the possibility that, for example, the unspecified other vehicle 10 is notified of the point specified by the terminal device 30 and the point is set as the destination for the driving assistance in the other vehicle 10.

After the identification information on the terminal device 30 is displayed on the driving assistance device 20, the destination is set in accordance with the user's operation for the driving assistance device 20. Thus, the occupant of the vehicle 10 can confirm that a notification source notifying the point to be set as the destination is the terminal device 30, and thereafter the occupant can cause the driving assistance device 20 to set the destination. As a result, it is possible to reduce a security risk, that is, it is possible to reduce the possibility that, for example, the driving assistance device 20 is notified of the point determined in the unspecified other terminal device 30 (for example, the terminal device 30b located outside the vehicle 10) and sets the point as the destination for the driving assistance.

The security risk is reduced in the driving assistance system 1 as described above. Thus, pairing of the driving assistance device 20 and the terminal device 30 can be omitted. Due to absence (omission) of the pairing, a processing load in each of the driving assistance device 20 and the terminal device 30 can be reduced.

For example, there is a case where the pairing between the driving assistance device 20 and the terminal device 30 is restricted such that the pairing cannot be performed during travel of the vehicle 10 in view of driver distraction. However, the pairing can be omitted as described above in the driving assistance system 1. Thus, even in such a case, in the driving assistance system 1, the terminal device 30*a* that is possessed by the passenger as the occupant of the vehicle 10 can notify the driving assistance device 20 at any timing. As a result, for example, the destination for the driving assistance can be changed with the use of the terminal device 30 during the travel of the vehicle 10. Thus, it is possible to improve usefulness (user-friendliness) of a driving assistance.

Next, each configuration in the driving assistance system 1 will be described in detail.

Figure 2:
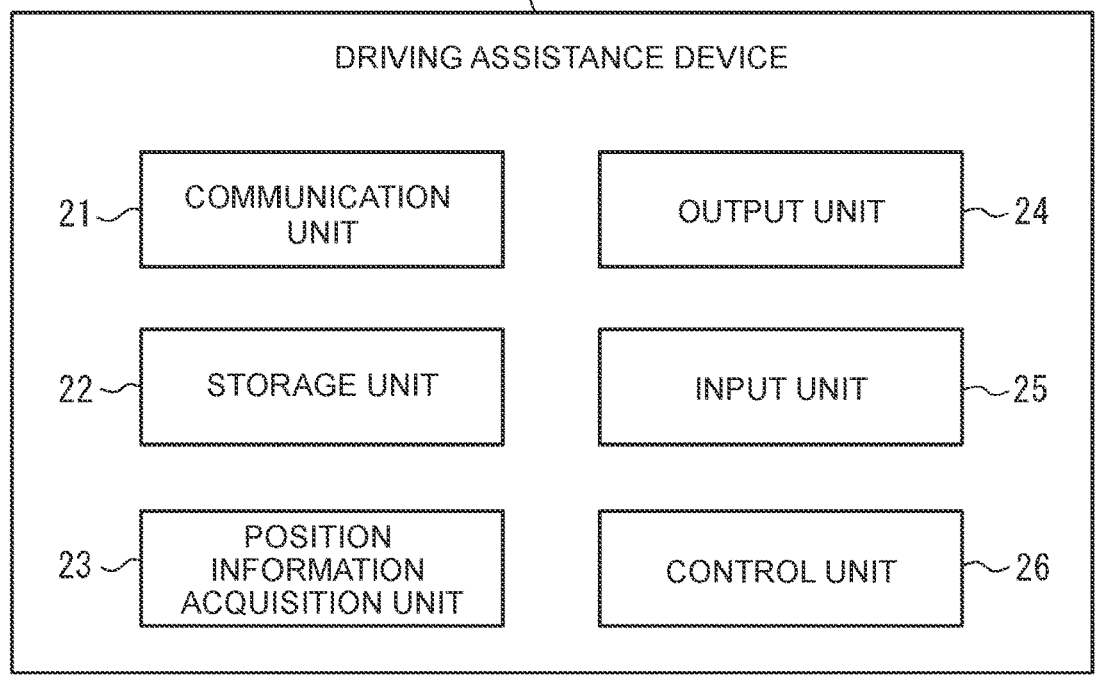
FIG. 2 is a block diagram of a schematic configuration of a driving assistance device.

The configuration of the driving assistance device 20 will be described. As shown in FIG. 2, the driving assistance device 20 includes a communication unit 21, a storage unit 22, a position information acquisition unit 23, an output unit 24, an input unit 25, and a control unit 26.

The communication unit 21 includes one or more communication modules each of which is compliant with a given communication standard. For example, the communication unit 21 may include the communication modules that are respectively compliant with an in-vehicle network standard such as CAN, the near-field wireless communication standard such as Bluetooth Low Energy (the registered trademark), a mobile communication standard such as 4th Generation (4G), and the like. In this embodiment, the driving assistance device 20 can communicate with the terminal device 30 via the communication unit 21.

The storage unit 22 includes one or more memory units. In this embodiment, the "memory unit" is, for example, a semiconductor memory unit, a magnetic memory unit, an optical memory unit, or the like. However, the "memory unit" is not limited thereto. Each of the memory units included in the storage unit 22 may function as a main storage unit, an auxiliary storage unit, or a cache memory unit, for example. The storage unit 22 stores any information used for the operation of the driving assistance device 20. For example, the storage unit 22 may store a system program, an application program, map information, traffic information, and the like. The information stored in the storage unit 22 can be updated with the use of information acquired from the outside via the communication unit 21, for example.

The position information acquisition unit 23 includes one or more receivers each of which corresponds to a given satellite positioning system. For example, the position information acquisition unit 23 may include a Global Positioning System (GPS) receiver. The position information acquisition unit 23 acquires position information on the vehicle 10 on which the driving assistance device 20 is mounted. For example, the position information on the vehicle 10 (i.e., the information on the position of the vehicle 10) is used for the driving assistance including the route guidance, automated driving, or the like.

The output unit 24 includes one or more output interfaces each of which outputs the information to the user. For example, the output interface may be a display that outputs information with the use of an image, or a speaker that outputs information with the use of a voice. However, the output interface is not limited thereto. The display may be, for example, a panel display or a head-up display. However, the display is not limited thereto. In this embodiment, the "image" may include a text, a still image, and a motion image.

The input unit 25 includes one or more input interfaces each of which detects the user input. For example, the input interface may be a physical key, a capacitive key, a touchscreen provided integrally with the panel display of the output unit 24, or a microphone that accepts voice input. However, the input interface is not limited thereto. In this embodiment, the description will be provided on the assumption that the input unit 25 includes at least the touchscreen.

The control unit 26 includes one or more processors. In this embodiment, the "processor" is a general-purpose processor or a dedicated processor that is dedicated to a particular process. However, the "processor" is not limited thereto. The control unit 26 controls the entire operation of the driving assistance device 20.

For example, the control unit 26 outputs a request signal for requesting a received signal strength indicator (RSSI) via the communication unit 21 with the use of the near-field wireless communication. The request signal transmitted with the use of the near-field wireless communication can be received by the terminal device 30 that is located in the vicinity of the driving assistance device 20. For example, in the case where the standard of the near-field wireless communication is Bluetooth Low Energy (the registered trademark), the request signal may include an advertisement packet. The control unit 26 may periodically and repeatedly transmit the request signal. The control unit 26 receives a response signal indicating the RSSI from the terminal device 30 that has received the request signal, via the near-field wireless communication.

On the basis of the RSSI received from the terminal device 30, the control unit 26 determines whether the terminal device 30 exists in the vehicle cabin of the vehicle 10. For example, the control unit 26 may determine whether the RSSI received from the terminal device 30 or a distance between the driving assistance device 20 and the terminal device 30 that is calculated on the basis of the RSSI satisfies a specified reference. In this way, the control unit 26 may determine whether the terminal device 30 exists in the vehicle cabin of the vehicle 10.

The principle of the determination will be described. The RSSI is lowered as the distance between the driving assistance device 20 and the terminal device 30 is increased. In addition, the RSSI is lowered in the case where a shielding body (a body member that defines a space in the vehicle cabin of the vehicle 10) exists between the driving assistance device 20 and the terminal devices 30. Accordingly, in the case where the RSSI is equal to or higher than a first reference value, it can be determined that the terminal device 30 exists in the vehicle cabin of the vehicle 10. The first reference value can be set in advance by an experiment or a simulation, for example. Thus, in the case where the control unit 26 determines that the RSSI received from the terminal device 30 satisfies the specified reference (for example, the RSSI is equal to or higher than the first reference value), the control unit 26 may determine that the terminal device 30 exists in the vehicle cabin of the vehicle 10.

The distance between the driving assistance device 20 and the terminal device 30 can be calculated on the basis of the RSSI. Accordingly, in the case where the calculated distance is shorter than a second reference value, it can be determined that the terminal device 30 exists in the vehicle cabin of the vehicle 10. The second reference value can be set in advance by an experiment or a simulation, for example. Thus, in the case where the calculated distance satisfies the specified reference (for example, in the case where the distance is shorter than the second reference value), the control unit 26 may determine that the terminal device 30 exists in the vehicle cabin of the vehicle 10.

In the case where the control unit 26 determines that the terminal device 30 does not exist in the vehicle cabin of the vehicle 10 (in this embodiment, in the case where the RSSI or the distance does not satisfy the specified reference), the control unit 26 does not execute a connection process that wirelessly connects the driving assistance device 20 to the terminal device 30. The connection process will be described later.

On the other hand, in the case where the control unit 26 determines that the terminal device 30 exists in the vehicle cabin of the vehicle 10 (in this embodiment, in the case where the RSSI or the distance satisfies the specified reference), the control unit 26 executes the connection process that connects the driving assistance device 20 to the terminal device 30 wirelessly via the near-field wireless communication, in cooperation with the terminal device 30. When the driving assistance device 20 is connected to the terminal device 30 wirelessly, the near-field wireless communication between the control unit 26 and the terminal device 30 becomes possible via the communication unit 21. In this embodiment, the information is exchanged between the driving assistance device 20 and the terminal device 30 that is determined to exist in the vehicle cabin of the vehicle 10, via the near-field wireless communication. However, the information may be exchanged therebetween via the mobile communication.

As described above, in the case where it is determined that the terminal device 30 exists in the vehicle cabin of the vehicle 10, the connection process is executed. Thus, it is possible to reduce a security risk, that is, it is possible to reduce the possibility that, for example, the driving assistance device 20 is wirelessly connected to the unspecified other terminal device 30 (for example, the terminal device 30b shown in FIG. 1). In addition, since the security risk is reduced, pairing of the driving assistance device 20 and the terminal device 30 can be omitted. In this embodiment, by executing the connection process (i.e., when the connection process is executed), the driving assistance device 20 and the terminal device 30 are connected to each other wirelessly without performing pairing (without being paired with each other). Due to the absence (omission) of the pairing, the processing load in each of the driving assistance device 20 and the terminal device 30 is reduced.

Alternatively, in the case where the occupant exists in the vehicle 10 and the control unit 26 determines that the terminal device 30 exists in the vehicle cabin of the vehicle 10, the control unit 26 may execute the above-described connection process. The occupant can be detected by any method. For example, the occupant may be detected on the basis of a detection signal of a seating sensor provided in each seat of the vehicle 10 and/or an image of a camera provided in the vehicle cabin of the vehicle 10. The control unit 26 may detect the occupant or may acquire a result of detection of an occupant from the vehicle 10. With the configuration, for example, in the case where the occupant does not exist in the vehicle 10, it is possible to reduce a security risk, that is, it is possible to reduce the possibility that the driving assistance device 20 is wirelessly connected to the unspecified other terminal device 30 (for example, the terminal device 30b shown in FIG. 1).

After the driving assistance device 20 is wirelessly connected to the terminal device 30, the control unit 26 notifies the terminal device 30 of (i.e., the control unit 26 provides the terminal device 30 with) the identification information on the vehicle 10 or identification information on the driving assistance device 20. After the control unit 26 notifies the terminal device 30 of the identification information, the control unit 26 receives the identification information on the terminal device 30 and information on the point on the map, which is determined by the terminal device 30, from the terminal device 30 as will be described later. The information on the point includes given information unique to the point. For example, the information on the point may include latitude and longitude information on the point, a name of a facility or a building that exists at the point, and the like. However, the contents of the information are not limited thereto.

The control unit 26 outputs the identification information on the terminal device 30 and the information on the point, which are notified from the terminal device 30, with the use of the image or the voice via the output unit 24. In the case where the control unit 26 detects specified user input via the input unit 25 after outputting the identification information on the terminal device 30 and the information on the point, the control unit 26 executes a setting process that sets the point as the destination for the driving assistance. In this embodiment, a description will be provided on the assumption that a screen including the identification information on the terminal device 30, the information on the point, a graphical user interface (GUI) that detects the user input, and the like appears on the display of the output unit 24. A specific example of the screen will be described later.

With the configuration, the occupant of the vehicle 10 can confirm that the notification source notifying the information on the point is the terminal device 30, and thereafter can cause the driving assistance device 20 to execute the destination setting process. For this reason, it is possible to reduce a security risk, that is, it is possible to reduce the possibility that, for example, the point determined by the unspecified other terminal device 30 (for example, the terminal device 30b shown in FIG. 1) is set as the destination for the driving assistance in the driving assistance device 20.

After setting the destination, the control unit 26 executes the driving assistance on the basis of the set destination. As described above, the driving assistance includes, for example, the route guidance or the automated driving to the destination. However, the driving assistance is not limited thereto.

Figure 3:
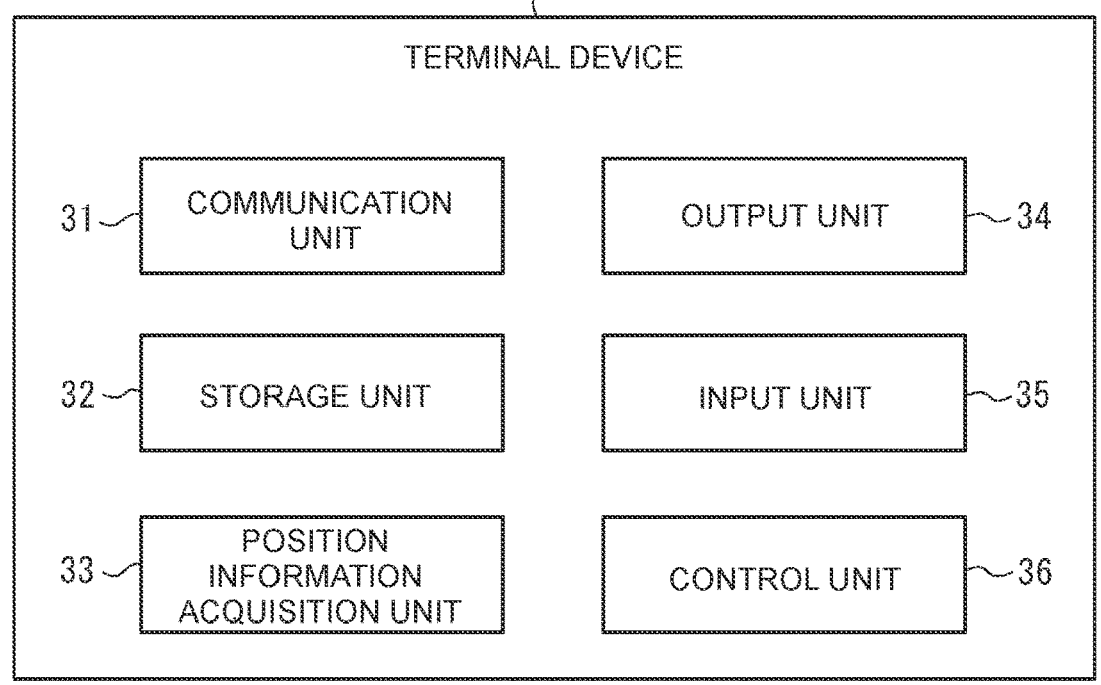
FIG. 3 is a block diagram of a schematic configuration of a terminal device.

The configuration of the terminal device 30 will be described. As shown in FIG. 3, the terminal device 30 includes a communication unit 31, a storage unit 32, a position information acquisition unit 33, an output unit 34, an input unit 35, and a control unit 36.

The communication unit 31 includes one or more communication modules each of which is compliant with a given communication standard. For example, the communication unit 31 may include the communication modules that are respectively compliant with the near-field wireless communication standard such as Bluetooth Low Energy (the registered trademark), the mobile communication standard such as 4G, and the like. In this embodiment, the terminal device 30 can communicate with the driving assistance device 20 via the communication unit 31.

The storage unit 32 includes one or more memory units. Each of the memory units included in the storage unit 32 may function as a main storage unit, an auxiliary storage unit, or a cache memory unit, for example. The storage unit 32 stores given information used for the operation of the terminal device 30. For example, the storage unit 32 may store a system program, an application program, the map information, the traffic information, and the like. The information stored in the storage unit 32 can be updated with the use of information acquired from the outside via the communication unit 31, for example.

The position information acquisition unit 33 includes one or more receivers each of which corresponds to a given satellite positioning system. For example, the position information acquisition unit 33 may include a GPS receiver. The position information acquisition unit 33 acquires position information on the terminal device 30 (i.e., information on the position of the terminal device 30).

The output unit 34 includes one or more output interfaces each of which outputs the information to the user. For example, the output interface may be a display that outputs the information with the use of an image, or a speaker that outputs the information with the use of voice. However, the output interface is not limited thereto. The display may be a panel display, for example. However, the display is not limited thereto.

The input unit 35 includes one or more input interfaces each of which detects the user input. For example, the input interface may be a physical key, a capacitive key, a touchscreen provided integrally with the panel display of the output unit 34, and a microphone that accepts the voice input. However, the input interface is not limited thereto. In this embodiment, the description will be provided on the assumption that the input unit 35 includes at least the touchscreen.

The control unit 36 includes one or more processors. The control unit 36 controls the entire operation of the terminal device 30.

For example, the control unit 36 activates a specified application program stored in the storage unit 32. The application program may be a general-purpose program or a dedicated program for the driving assistance system 1. In a state where the application program is activated, the control unit 36 executes various processes.

More specifically, the control unit 36 determines the point on the map in accordance with the user input detected via the input unit 35. The user input may be given input with which the point on the map can be identified. For example, the control unit 36 shows the map based on the map information on the display of the output unit 34. On the basis of the position information acquired by the position information acquisition unit 33, the control unit 36 may display a current position of the terminal device 30 on the map. When the user input that specifies a position on the displayed map is detected, the control unit 36 may determine the point on the map corresponding to the position. Alternatively, when the user input that specifies the name or a telephone number of the facility, the building, or the like is detected, the control unit 36 may determine the point on the map corresponding to a position of the facility, the building, or the like. However, the operation of the application program for determining the point on the map in accordance with the user input is not limited to the above-described example, and the point on the map may be determined in any manner. The point may be determined at timing before or after the driving assistance device 20 and the terminal devices 30 are wirelessly connected.

The control unit 36 can receive the request signal, which requests the RSSI and is transmitted from the driving assistance device 20 as described above, via the communication unit 31 with the use of the near-field wireless communication. In response to the reception of the request signal, the control unit 36 transmits the response signal indicating the RSSI to the driving assistance device 20 with the use of the near-field wireless communication. In the case where the RSSI is equal to or higher than the above-described first reference value, or in the case where the distance between the driving assistance device 20 and the terminal device 30, which is calculated on the basis of the RSSI, is shorter than the above-described second reference value, the control unit 36 may transmit the response signal indicating the RSSI to the driving assistance device 20.

After the response signal is transmitted, the driving assistance device 20 and the terminal devices 30 can be connected to each other wirelessly without performing pairing as described above. After the driving assistance device 20 and the driving assistance device 20 are connected to each other wirelessly, the control unit 36 receives the identification information on the vehicle 10 or the driving assistance device 20, which is notified from the driving assistance device 20 as described above.

The control unit 36 outputs the identification information on the vehicle 10 or the driving assistance device 20, which is notified from the driving assistance device 20, and the information on the point on the map, which is determined as described above, with the use of an image or a voice via the output unit 34. In the case where the control unit 36 detects specified user input via the input unit 35 after outputting the identification information on the vehicle 10 or the driving assistance device 20 and the information on the point, the control unit 36 notifies the driving assistance device 20 of (i.e., the control unit 36 provides the driving assistance device 20 with) the identification information on the terminal device 30 and the information on the point. In this embodiment, a description will be provided on the assumption that a screen including the identification information on the vehicle 10, the information on the point, the GUI that detects the user input, and the like appears on the display of the output unit 34. A specific example of the screen will be described later. With the configuration, the user of the terminal device 30 can confirm that the notification destination to which the information on the point is notified is the vehicle 10 or the driving assistance device 20, and thereafter can cause the terminal device 30 to notify the driving assistance device 20 of the identification information on the terminal device 30 and the information on the point. Therefore, it is possible to reduce a security risk, that is, it is possible to reduce the possibility that, for example, the unspecified other vehicle 10 is notified of the information on the point specified by the terminal devices 30.

Figure 4:
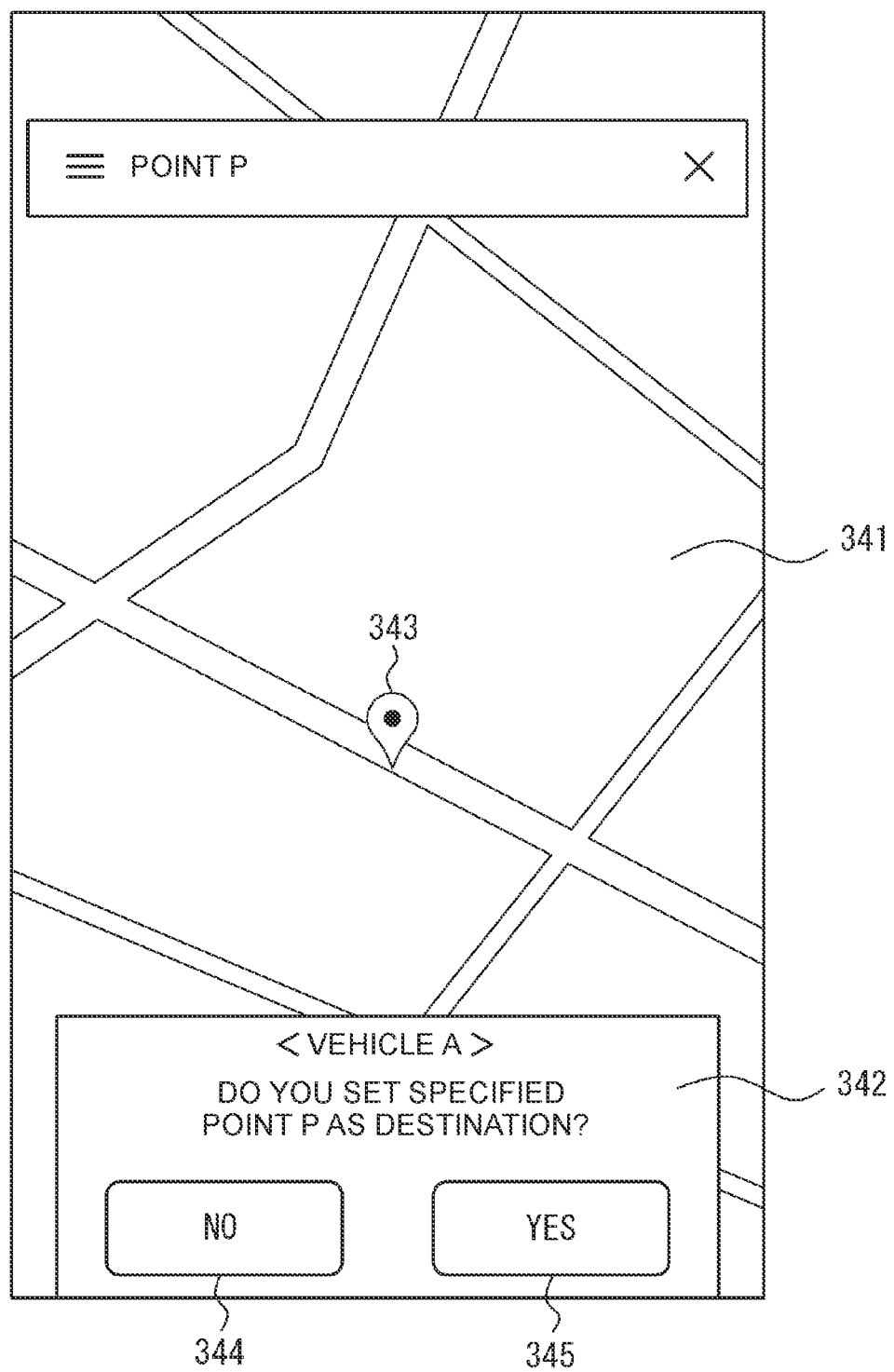
FIG. 4 is a view of an example of a screen displayed by the terminal device.

An example of the screen of the terminal device 30 will be described. With reference to FIG. 4, a description will be provided on an example of the screen that appears on the display of the output unit 34 in the state where the above-described application program is activated in the terminal device 30. The screen includes a map display region 341 and a notification region 342.

In the map display region 341, an image of the map based on the map information and an input form that accepts character input from the user are displayed. For example, when detecting the user input of tapping a position on the map in the map display region 341, the control unit 36 in the terminal device 30 determines the point on the map corresponding to the position. In FIG. 4, the specified position on the map is indicated by a marker 343. Alternatively, the control unit 36 may determine the point on the map corresponding to information input to the input form (for example, the name or the telephone number of the facility or the like).

When the position on the map is determined, the control unit 36 superimposes the notification region 342 on the map display region 341. In the notification region 342, the identification information on the vehicle 10, which is wirelessly connected to the terminal device 30, (a "VEHICLE A" in FIG. 4) and the information on the determined point (a "POINT P" in FIG. 4) are displayed. For example, as shown in FIG. 4, a message that urges the user to confirm whether to set the "POINT P" as the destination for the driving assistance for the "VEHICLE A" may be displayed in the notification region 342. A mode of displaying the identification information on the vehicle 10 and the information on the point is not limited to the mode in the example of the message, and any displaying mode may be used.

In the notification region 342, a NO button 344 and a YES button 345 are displayed. Each of the NO button 344 and the YES button 345 is the GUI that detects the user input. When detecting the user input on the NO button 344, the control unit 36 hides the notification region 342 and urges the user to specify the position on the map again, for example. When detecting the user input on the YES button 345, the control unit 36 notifies the driving assistance device 20 mounted on the "VEHICLE A" of the identification information on the terminal device 30 and information on the "POINT P" as described above.

Figure 5:
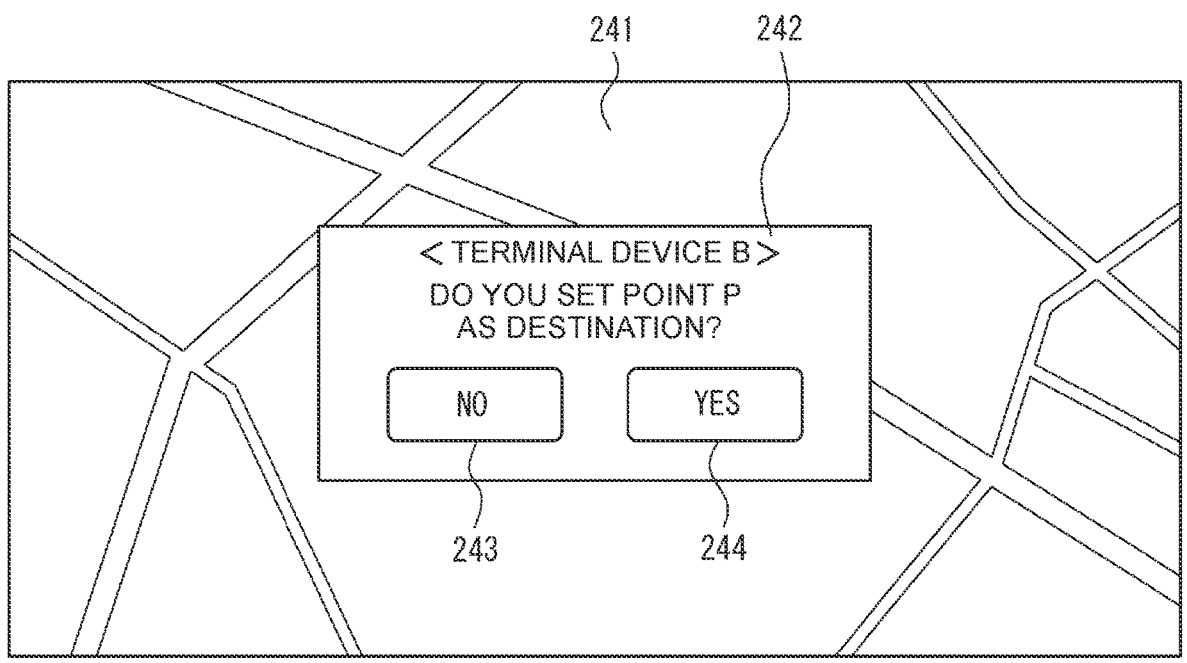
FIG. 5 is a view of an example of a screen displayed by the driving assistance device.

An example of the screen of the driving assistance device 20 will be described. With reference to FIG. 5, a description will be provided on an example of the screen that appears on the display of the output unit 24 in the driving assistance device 20. The screen includes an assistance information display region 241 and a notification region 242.

In the assistance information display region 241, information used for the route guidance as the driving assistance is displayed, for example. The information used for the route guidance includes the map based on the map information, for example. However, the information used for the route guidance is not limited thereto and may include, for example, an image indicating a current position of the vehicle 10, a guide line indicating a route of the vehicle 10, an image urging the user to perform a driving operation such as turning to the left or the right, and the like. Contents of the information displayed in the assistance information display region 241 may be changed in accordance with a driving condition of the vehicle 10, for example.

As described above, when the driving assistance device 20 is notified of the identification information on the terminal device 30 and the information on the point, the control unit 26 superimposes, for example, the notification region 242 on the assistance information display region 241. In the notification region 242, the identification information on the terminal device 30 (a "TERMINAL DEVICE B" in FIG. 5) and the information on the point (the "POINT P" in FIG. 5) are displayed. For example, as shown in FIG. 5, a message that urges the user to confirm whether to set the "POINT P" notified from the "TERMINAL DEVICE B" as the destination for the driving assistance may be displayed in the notification region 242. A mode of displaying the identification information on the terminal device 30 and the information on the point is not limited to the mode in the example of the message and any displaying mode may be used.

In the notification region 242, a NO button 243 and a YES button 244 are displayed. Each of the NO button 243 and the YES button 244 is the GUI that detects the user input. When detecting the user input on the NO button 243, the control unit 26 hides the notification region 242 and discards the information on the point notified from the terminal device 30, for example. Meanwhile, when detecting the user input on the YES button 244, the control unit 26 executes the setting process to set the "POINT P" as the destination for the driving assistance as described above.

Referring to FIG. 6, a description will be provided on a flow of the operation of the driving assistance system 1.

In step S100, the driving assistance device 20 transmits the request signal for requesting the RSSI (i.e., the RSSI request signal) via the near-field wireless communication.

In step S101, in response to the reception of the request signal transmitted in step S100, the terminal device 30 transmits the response signal indicating the RSSI to the driving assistance device 20 via the near-field wireless communication.

In step S102, the driving assistance device 20 determines whether the RSSI received from the terminal device 30 or the distance between the driving assistance device 20 and the terminal device 30, which is calculated on the basis of the RSSI, satisfies the specified reference. If the driving assistance device 20 determines that the RSSI or the distance satisfies the specified reference (Yes in step S102), the process proceeds to step S103. On the other hand, if the driving assistance device 20 determines that the RSSI or the distance does not satisfy the specified reference (No in step S102), the process returns to step S100.

In step S103, the driving assistance device 20 determines whether the occupant exists in the vehicle 10. If the driving assistance device 20 determines that the occupant exists (Yes in step S103), the process proceeds to step S104. On the other hand, if the driving assistance device 20 determines that the occupant does not exist (No in step S103), the process returns to step S100.

In step S104, the driving assistance device 20 and the terminal devices 30 perform the connection process so as to be connected to each other wirelessly via the near-field wireless communication. As described above, in this embodiment, by executing the connection process, the driving assistance device 20 and the terminal device 30 are connected to each other wirelessly without performing pairing (without being paired with each other).

In step S105, the driving assistance device 20 notifies the terminal device 30 of the identification information on the vehicle 10 or the driving assistance device 20 (i.e., the driving assistance device 20 notifies the identification information on the vehicle 10 or the driving assistance device 20 to the terminal device 30).

In step S106, the terminal device 30 determines the point on the map in accordance with the user input.

In step S107, the terminal device 30 outputs, as the image or the voice, the identification information on the vehicle 10 or the driving assistance device 20, which is notified in step S105, and the information on the point, which is determined in step S106.

After outputting the identification information on the vehicle 10 or the driving assistance device 20 and the information on the point in step S107, the terminal device 30 notifies the driving assistance device 20 of the identification information on the terminal device 30 and the information on the point (i.e., the terminal device 30 notifies the identification information on the terminal device 30 and the information on the point to the driving assistance device 20), in accordance with the user input in step S108.

In step S109, the driving assistance device 20 outputs, as the image or the voice, the identification information on the terminal device 30 and the information on the point, which are notified in step S108.

After outputting the identification information on the terminal device 30 and the information on the point in step S109, the driving assistance device 20 executes the setting process to set the point as the destination for the driving assistance, in accordance with the user input in step S110.

After setting the destination in step S110, the driving assistance device 20 performs the driving assistance on the basis of the set destination in step S111.

As described so far, in the driving assistance system 1 according to this embodiment, after being wirelessly connected to the terminal device 30, the driving assistance device 20 outputs the identification information on the terminal device 30 as the image or the voice. In the case where the driving assistance device 20 detects the user input after outputting the identification information on the terminal device 30, the driving assistance device 20 executes the setting process to set the point that is determined in the terminal device 30, as the destination for the driving assistance. With this configuration, it is possible to reduce a security risk, that is, it is possible to reduce the possibility that, for example, the driving assistance device 20 is notified of the point determined in the unspecified other terminal device 30 (for example, the terminal device 30b located outside the vehicle cabin of the vehicle 10) and sets the point as the destination for the driving assistance, for example. In addition, since the security risk is reduced, pairing of the driving assistance device 20 and the terminal device 30 can be omitted. Due to the absence of the pairing, the processing load of each of the driving assistance device 20 and the terminal device 30 can be reduced. Thus, according to this embodiment, a driving assistance technique for the vehicle 10 with the use of a plurality of devices mutually connected wirelessly is improved in view of security and a processing load.

The disclosure has been described on the basis of the drawings and the embodiment. It should be noted that a person skilled in the art can easily make various changes and modifications on the basis of the present disclosure. Therefore, it should also be noted that these changes and modifications fall within the scope of the disclosure. For example, functions and the like provided in components, steps, or the like may be rearranged such that logical inconsistency is not caused. In addition, the plurality of components, the plurality of the steps, or the like may be combined into one or may be divided.

For example, in the above-described embodiment, a part of the configuration and a part of the functions of the driving assistance device 20 may be provided in another device. As an example, a part or all of the communication function provided in the communication unit 21 of the driving assistance device 20 may be provided in in-vehicle communication device such as a data communication module (DCM).

In the above-described embodiment, the terminal device 30 notifies the driving assistance device 20 of the identification information on the terminal device 30 and the information on the point in the case where a condition that the specified user input is detected after the identification information on the vehicle 10 or the driving assistance device 20 and the information on the point are output as the image or the voice is satisfied. In addition to the condition, or instead of the condition, it is possible to adopt a condition that the user enters code information (for example, a randomly determined passcode) that is output as the image or the voice by the driving assistance device 20, in the terminal device 30. More specifically, the driving assistance device 20 generates the code information, outputs the code information as the image or the voice, and notifies the terminal device 30 of the code information. The terminal device 30 waits for the user input of the code information, that is, the terminal device 30 waits for the user to input the code information. In the case where the code information notified from the driving assistance device 20 matches the code information entered by the user, the terminal device 30 notifies the driving assistance device 20 of the identification information on the terminal device 30 and the information on the point. With the configuration, as in the above-described embodiment, it is possible to reduce a security risk, that is, it is possible to reduce the possibility that, for example, the unspecified other vehicle 10 is notified of the point specified by the terminal devices 30.

In the above-described embodiment, in the case where the driving assistance device 20 detects the specified user input after outputting the information on the point, which is notified from the terminal device 30, as the image or the voice, the driving assistance device 20 executes the setting process to set the point as the destination for the driving assistance. Here, the driving assistance device 20 may store the identification information on the terminal device 30 that has notified the driving assistance device 20 of the information on the point set as the destination. In the case where the driving assistance device 20 is newly notified of the information on the point from the terminal device 30 (that is, in the case where the driving assistance device 20 receives the second or later notification from the terminal device 30), the driving assistance device 20 may set the newly notified point as the destination without waiting for the user input into the driving assistance device 20. With the configuration, in the case where the user attempts to set the next destination using the terminal device 30 that has been used once to set the destination, the user input into the driving assistance device 20 can be omitted. Therefore, complexity of the user operation is reduced. The driving assistance device 20 may set the point that is notified from the terminal device 30 for the first time as the destination and may thereafter set the new point that is notified from the terminal device 30 for the second time or onward as the destination until the point is notified a specified number of times or a specified period is reached.

In the above-described embodiment, the driving assistance device 20 mounted on the vehicle 10 determines whether the terminal device 30 exists in the vehicle cabin of the vehicle 10 on the basis of the RSSI received from the terminal device 30. Instead of the above configuration, the driving assistance device 20 may store a smart key of the vehicle 10 and the identification information on the terminal device 30 associated with the smart key in advance. For example, in the case where the smart key exists in the vehicle cabin, and the driving assistance device 20 receives the response signal indicating the RSSI from the terminal device 30 associated with the smart key, regardless of the RSSI, the driving assistance device 20 may determine that the terminal device 30 exists in the vehicle cabin of the vehicle 10.

In the above-described embodiment, there is a case where the terminal device 30 is wirelessly connected to the plurality of the driving assistance devices 20, each of which is mounted on corresponding one of the plurality of the vehicles 10. In this case, the terminal device 30 may allow the user to select the notification destination to which the information on the point is to be notified, from the plurality of the vehicles 10 or the plurality of the driving assistance devices 20. More specifically, the terminal device 30 may display the identification information on the plurality of the vehicles 10 or the plurality of the driving assistance devices 20 in a selectable manner. The terminal device 30 may display the identification information on the plurality of the vehicles 10 or the plurality of the driving assistance devices 20 in a descending order of the RSSI. The terminal device 30 may determine the driving assistance device 20 that is mounted on the vehicle 10 specified in accordance with the user input or the driving assistance device 20 specified in accordance with the user input, as the notification destination to which the information on the point is to be notified.

In the above-described embodiment, when receiving the identification information on the terminal device 30 and the information on the point determined in the terminal device 30, the driving assistance device 20 outputs the identification information and the information on the point as the image or the voice and executes the setting process to set the destination (i.e., the destination setting process) in accordance with the specified user input. The driving assistance device 20 can also be configured not to execute the destination setting process during the travel of the vehicle 10. "During the travel" may include a state where the vehicle 10 is currently traveling, a state where the vehicle 10 is temporarily stopped at a traffic light, or the like. More specifically, control may be executed such that the driving assistance device 20 does not receive the identification information on the terminal device 30 and the information on the point during the travel of the vehicle 10. Alternatively, even in the case where the driving assistance device 20 receives the identification information on the terminal device 30 and the information on the point during the travel of the vehicle 10, control may be executed such that the driving assistance device 20 does not output the identification information and the information on the point as the image or the voice and does not execute the destination setting process. With the configuration, it is possible to reduce the possibility that, for example, in the case where the other vehicle 10 travels side-by-side with the traveling vehicle 10, the driving assistance device 20 is notified of the identification information and the like on the other terminal device 30 operated by an occupant of the other vehicle 10.

It is possible to employ the configuration in which a processor installed in a general-purpose electronic device, such as a smartphone, a tablet terminal, or a mobile computer, functions as the driving assistance device 20 or the terminal device 30 according to the above-described embodiment. More specifically, in this configuration, memory of the electronic device stores a program that describes process contents for realizing the functions of the driving assistance device 20 or the terminal device 30 according to the embodiment, and the processor of the electronic device reads and executes the program. Therefore, the disclosure according to this embodiment can be also realized as the program that can be executed by the processor.

What is claimed is:

1. A driving assistance device mounted in a vehicle, the driving assistance device comprising:
   a communication unit configured to perform communication;
   an output unit configured to output information as an image or a voice;
   an input unit configured to detect user input; and
   a processor programmed to perform driving assistance with use of a point on a map as a destination, wherein the processor is programmed to:
   i) execute a connection process to connect the driving assistance device to a terminal device wirelessly via the communication unit (i) without performing pairing and (ii) without the driving assistance device and the terminal device being previously paired,
   ii) output identification information on the terminal device as the image or the voice via the output unit after the driving assistance device is wirelessly connected to the terminal device, and
   iii) execute a setting process to set the point determined by the terminal device as the destination for the driving assistance in a case where the processor detects specified user input via the input unit after outputting the identification information on the terminal device.

2. The driving assistance device according to claim 1, wherein:
   the processor is programmed to determine whether a received signal strength indicator in wireless communication between the terminal device and the driving assistance device or a distance between the driving assistance device and the terminal device calculated based on the received signal strength indicator satisfies a specified reference; and
   the processor is programmed to execute the connection process in a case where the processor determines that the received signal strength indicator or the distance satisfies the specified reference.

3. The driving assistance device according to claim 2, wherein the processor is programmed to execute the connection process in a case where an occupant exists in the vehicle and the processor determines that the received signal strength indicator or the distance satisfies the specified reference.

4. The driving assistance device according to claim 1, wherein:
   the processor is programmed to notify the terminal device of identification information on the vehicle or the driving assistance device; and
   the processor is programmed to execute the setting process after the processor notifies the terminal device of the identification information on the vehicle or the driving assistance device.

5. A control method of a terminal device configured to communicate with a driving assistance device mounted on a vehicle, the control method comprising:
   executing a connection process to connect the driving assistance device to the terminal device wirelessly (i) without performing pairing and (ii) without the driving assistance device and the terminal device being previously paired;
   determining a point on a map in accordance with user input;
   outputting identification information on the vehicle or the driving assistance device as an image or a voice when the terminal device is wirelessly connected to the driving assistance device; and
   notifying the driving assistance device of identification information on the terminal device and information on the point in a case where specified user input is detected after outputting the identification information on the vehicle or the driving assistance device.

6. A non-transitory computer-readable medium storing a program that causes a terminal device to perform operations, the terminal device being configured to communicate with a driving assistance device mounted on a vehicle, the operations comprising:
   executing a connection process to connect the driving assistance device to the terminal device wirelessly (i) without performing pairing and (ii) without the driving assistance device and the terminal device being previously paired;
   determining a point on a map in accordance with user input;

outputting identification information on the vehicle or the driving assistance device as an image or a voice when the terminal device is wirelessly connected to the driving assistance device; and notifying the driving assistance device of identification information on the terminal device and information on the point in a case where specified user input is detected after outputting the identification information on the vehicle or the driving assistance device.

\* \* \* \* \*

UNITED STATES PATENT AND TRADEMARK OFFICE
CERTIFICATE OF CORRECTION

| | | |
|---|---|---|
| PATENT NO. | : 11,243,090 B2 | Page 1 of 1 |
| APPLICATION NO. | : 16/292538 | |
| DATED | : February 8, 2022 | |
| INVENTOR(S) | : Akira Sasaki et al. | |

It is certified that error appears in the above-identified patent and that said Letters Patent is hereby corrected as shown below:

On the Title Page

Item (56), the following document should be added under U.S. PATENT DOCUMENTS:
-- 2015/0149042 A1 5/2015 Cooper et al. --

Item (56), the following document should be added under FOREIGN PATENT DOCUMENTS:
-- CN 107121664 A 9/2017 --

Signed and Sealed this
Twenty-sixth Day of April, 2022

Katherine Kelly Vidal
*Director of the United States Patent and Trademark Office*